US012786011B2

(12) United States Patent
Fons Lluis et al.

(10) Patent No.: US 12,786,011 B2
(45) Date of Patent: Nov. 3, 2026

(54) FRAME NORMALIZATION FOR HETEROGENEOUS NETWORKS IN AUTOMOTIVE GATEWAYS

(71) Applicant: Yingwang Intelligent Technologies Co., Ltd., Shenzhen (CN)

(72) Inventors: Francisco Fons Lluis, Munich (DE); Angela Gonzalez Marino, Munich (DE)

(73) Assignee: YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 312 days.

(21) Appl. No.: 18/541,347

(22) Filed: Dec. 15, 2023

(65) Prior Publication Data

US 2024/0121134 A1 Apr. 11, 2024

Related U.S. Application Data

(63) Continuation of application No. PCT/EP2021/066238, filed on Jun. 16, 2021.

(51) Int. Cl.
*H04L 12/66* (2006.01)
*H04L 12/40* (2006.01)

(52) U.S. Cl.
CPC .............. *H04L 12/66* (2013.01); *H04L 12/40* (2013.01); *H04L 2012/40215* (2013.01)

(58) Field of Classification Search
CPC ....... H04L 69/16; H04L 69/161; H04L 69/12; H04L 69/22; H04L 69/166; H04L 69/163;
(Continued)

(56) References Cited

U.S. PATENT DOCUMENTS

2006/0271694 A1* 11/2006 Matsuo ............... H04L 49/9078 709/229
2012/0327939 A1* 12/2012 Jang ........................ H04L 12/66 370/392

(Continued)

FOREIGN PATENT DOCUMENTS

WO 2021190746 A1 9/2021
WO 2022117201 A1 6/2022

(Continued)

OTHER PUBLICATIONS

Marino, A. G., et al., "Elastic Queueing Engine for Time Sensitive Networking", 2021 IEEE 93rd Vehicular Technology Conference (VTC2021-Spring), Helsinki, Finland, Apr. 25-28, 2021, pp. 1-7, DOI: 10.1109/VTC2021-Spring51267.2021.9448758, 7 pages.

(Continued)

*Primary Examiner* — Kharye Pope

(74) *Attorney, Agent, or Firm* — Conley Rose, P.C.

(57) ABSTRACT

A device for a gateway controller for frame normalization comprises processing circuitry that is configured to receive one or more ingress frames of bits, wherein each ingress frame has one of multiple frame formats included in a set of frame formats, and is configured to convert each ingress frame into a normalized frame of bits, wherein each normalized frame has a normalized frame format.

20 Claims, 14 Drawing Sheets

(58) Field of Classification Search
CPC ... H04L 49/3009; H04L 49/90; H04L 49/901; H04L 63/0428
See application file for complete search history.

(56) References Cited

U.S. PATENT DOCUMENTS

| | | | | |
|---|---|---|---|---|
| 2017/0072876 | A1* | 3/2017 | Rajan | H04L 12/66 |
| 2020/0220888 | A1* | 7/2020 | Terazawa | B60T 17/221 |
| 2020/0366529 | A1* | 11/2020 | Park | H04L 69/22 |
| 2021/0185070 | A1* | 6/2021 | Jeon | H04L 12/66 |
| 2021/0243047 | A1* | 8/2021 | Arndt | H04L 69/08 |
| 2023/0179443 | A1* | 6/2023 | Kim | H04L 12/4625<br>370/412 |

FOREIGN PATENT DOCUMENTS

| | | | |
|---|---|---|---|
| WO | 2022117202 | A1 | 6/2022 |
| WO | 2022122171 | A1 | 6/2022 |
| WO | 2022199787 | A1 | 9/2022 |

OTHER PUBLICATIONS

Marino, A. G., et al., "PDU Normalizer Engine for Heterogeneous In-Vehicle Networks in Automotive Gateways", Jun. 29, 2021, 16 pages.

Marino, A. G., et al., "Traffic Shaping Engine for Time Sensitive Networking Integration within In-Vehicle Networks", 2021 IEEE Vehicular Networking Conference (VNC), Ulm, Germany, Nov. 10-12, 2021, pp. 182-189, DOI: 10.1109/VNC52810.2021.9644668, 8 pages.

* cited by examiner

Table 1. PDUNE Memory Map

| Offset | Reg. Name | Function | Offset | Reg. Name | Function |
|---|---|---|---|---|---|
| 0x1X | INTERFACES CONFIGURATION | | 0x2X | PORT CONFIGURATION | |
| 0x10 | DATA_BUS_WIDTH | Data bus width (in/out) | 0x20 | PORT_CONFIG | Port parameters |
| 0x12 | CTRL_BUS_WIDTH | Control bus width (in/out) | 0x22 | OPERATION_MODE | Operation mode & priority |
| 0x14 | TIMESTAMP_WIDTH | Input Timer bus width | 0x4X | INSTRUCTION FIELDS CONFIGURATION | |
| 0x16 | FIFO_BUS_WIDTH | FIFO buses width (R/W) | 0x40 | INST_FIELD_SIZE0 | Size of Port ID & Protocol |
| 0x18 | GCD_SBUS_WIDTH | System bus width (Greatest Common Divisor) | 0x42 | INST_FIELD_SIZE1 | Size of Priority & Matching |
| 0x3x | STATISTICS | | 0x44 | INST_FIELD_SIZE2 | Size of OPCODE and CS |
| 0x30 | LINK_STATUS | Link status information | 0x46 | DEF_OPCODE | Default instr. OPCODE |
| 0x32 | RX_COUNT | Received frames count | 0x48 | DROP_OPCODE | OPCODE for a frame drop |
| 0x34 | DROP_COUNT | Invalid received frames count | 0x4A | SIZE_COUNT | Data size count parameters |
| 0x36 | INST_COUNT | Generated instructions count | 0x4C | PADDING | Padding pattern |
| 0X38 | INST_FAIL_COUNT | Invalid instructions count | 0x4E | MATCH | Match counter |
| 0x5X | PHY INTERFACE CONFIGURATION | | 0x6X | FRAME INTEGRITY CHECK CONFIGURATION | |
| 0x5X | RESERVED | HW dependent | 0x60 | INTEGRITY_CHECK | Integrity check method |

FIG. 13

FRAME NORMALIZATION FOR HETEROGENEOUS NETWORKS IN AUTOMOTIVE GATEWAYS

CROSS-REFERENCE TO RELATED APPLICATIONS

This application is a continuation application of International Patent Application No. PCT/EP2021/066238 filed on Jun. 16, 2021, which is hereby incorporated by reference in its entirety.

TECHNICAL FIELD

The present disclosure relates to gateways for a user equipment (UE), in particular, to gateway controllers of vehicles. The disclosure provides a device and method for a gateway controller, wherein the device is configured to perform frame normalization, i.e., is able to convert an ingress frame format into a normalized frame format. This is especially advantageous in heterogeneous networks, in which the gateway controller receives different types of ingress frame format. This is typically the case for the automotive electronics industry, hence, the device and method are applicable to automotive gateways.

BACKGROUND

Nowadays, the automotive electronics industry is immersed in a deep transformation in response to the new era of mobility, in search of the future autonomous, connected, electric and shared vehicle.

Triggered by this transformation, the automotive electrics/electronics (E/E) & in-vehicle networking (IVN) architectures of vehicles are transitioning from a domain-based approach—which includes splitting the functionality of the vehicle in a logical way through functional domains—to a new approach that is driven by a zonal distribution, wherein mixed functions of whatever domain coexist in each physical zone. Thus, the wiring harness scalability wall detected in the precedent solutions may be overcome.

An immediate impact of this transition is the game changer role to be played by the gateway controller in a UE, particularly vehicle. While in the domain-based E/E architecture the gateway controller deploys the role of a central gateway, which is responsible for interconnecting the different domain controllers (e.g., advanced driver-assistance systems (ADAS), infotainment, body, cockpit, energy management, etc.) through a network backbone like automotive Ethernet, in the new zone-base architecture the complete vehicle functionality is redistributed not through domain controllers, but in one or more central computers and several zonal gateway controllers, particularly, one per each physical zone.

The role of the new zonal gateway controller consists in the power and communication management of one specific physical zone of the vehicle. Due to this new architectural approach, the zonal gateway controller is becoming more and more a key piece of the vehicle infrastructure.

Gatewaying is, by nature, a complex and high demanding processing/computational task. The gateway controller takes charge of receiving and sending frames from ingress ports to egress ports by encapsulating, aggregating and/or processing protocol data units (PDUs) or data frames according to networking protocols and standards, in particular, in line with the well-known network Open Systems Interconnection (OSI) model, which is decomposed in layers.

One of the main challenges seen in the automotive gateway controller is the coexistence of heterogeneous networking technologies and protocols Local Interconnect Network: on the one side, automotive legacy busses like controller area network (CAN), (LIN), FlexRay, and on the other side, new network protocols recently adopted from information and communications technology (ICT) and high-performance computing (HPC) fields, for instance, Ethernet, Mobile Industry Processor Interface (MIPI) or Peripheral Component Interconnect Express (PCIe). Some examples of frame structures for different technologies and protocols—namely for LIN 101, CAN 102, CAN FD 103, CAN XL 104, FlexRay 105, and Ethernet 106—are depicted in FIG. 1.

The engineering effort required to develop an automotive electronic gateway controller (i.e., hardware (HW) and software (SW) co-design) cannot be underestimated: a big team of several tens of HW, SW and system engineers typically works together for a long time, normally not less than one or two years, and is required to cover the full product development cycle, from concept to design and development (D&D) to verification and validation (V&V) to start of production (SOP).

Conventionally, the functional gateway implementation is mainly based on a SW implementation. This solution is typically central processing unit (CPU)-centric, i.e., the gatewaying and processing is deployed in SW running of one or more cores of a microcontroller unit (MCU) or system-on-chip (SoC) device.

It is important to note here that also the interconnection of CAN, LIN, FlexRay, or Ethernet frames is conventionally done in SW. That is, the CPU or MCU reads ingress frames from CAN reception buffers and transfer them to Ethernet (ETH) egress buffers in case of performing the tunneling or gatewaying of CAN-to-ETH. However, this approach based on SW, although de facto a solution today, is not the best choice when moving to autonomous driving (AD) solutions, particularly not in terms of latency and performance of next-gen layer 3 (L3)-to-layer 5 (L5) AD vehicles.

SUMMARY

In view of the above, an objective of this disclosure is to provide a device and a method that enable a HW-driven gatewaying approach, in particular, in view of the coexistence of the heterogeneous networking technologies and protocols, for example, as described above.

This objective is achieved by the embodiments of this disclosure as described in the enclosed independent claims. Advantageous implementations of the embodiments are further defined in the dependent claims.

In particular, these embodiments are based on the following considerations.

The gateway controller is responsible for performing a full set of networking features, mainly the data encapsulation, forwarding/routing, tunneling and processing of PDUs among different networks of a given in-vehicle network infrastructure. This heterogeneity of network technologies and protocols increases the complexity and the computing effort demanded to the gateway controller. Consequently, unlike other networking devices—like enterprise switches or routers based only on Ethernet technology—in the particular case of an automotive gateway controller, the diversity and heterogeneity of network technologies and protocols coexisting at the same time in the same device is a feature that increases notoriously the complexity of the networking device, especially regarding the handling at real-time of ingress and egress frames of different nature. The embodiments of this disclosure thus put their focus on these problems, and are especially aimed on contributing an effective implementation solution.

The ideal gateway processing would consist in performing the adaptation of frames (particularly PDUs) from one network to another, while minimizing the effects of this transformation. For instance, minimizing the latency of such processing when moving the frames or PDUs from one or more ingress ports to one or more egress ports of the gateway controller (e.g., according to the switching/routing mechanisms in place). Many of these tasks performed by the gateway controller are time consuming tasks, for instance, the protocol conversion and data encapsulation from one network to another, as depicted in FIG. 2.

In view of the above, the embodiments of this disclosure aim to enable frame normalization, which is applicable to the gatewaying of heterogeneous networks. The implementation of this concept should be provided in a very flexible way in HW. Nevertheless, the embodiments should be fully software-defined networking (SDN) compliant. The embodiments have the further goal of providing a scalable solution in terms of geometry (e.g., including the number of ingress and egress ports, the kind of network protocols, etc.) and features (e.g., cut-through or store-and-forward mode, integrity check based on cyclic redundancy check (CRC), checksum (CS) or parity bit (PB), etc.).

These and other goals are also achieved by the embodiments of this disclosure. All in all, the PDU normalization concept proposed here becomes a new dimension or abstraction layer not covered by the OSI model and its 7 abstraction layers, in the sense that it enables the handling of several heterogeneous networks at the same time instead of only a single one.

A first aspect of this disclosure provides a device for a gateway controller of a user equipment, the device comprising processing circuitry configured to receive one or more ingress frames of bits, wherein each ingress frame has one of multiple frame formats included in a set of frame formats, and convert each ingress frame into a normalized frame of bits, wherein each normalized frame has a normalized frame format.

Accordingly, the device of the first aspect is configured to normalize frames of heterogeneous networking technologies and protocols. Thus, the gateway controller may be provided with this function by employing the device. In particular, the gateway controller may be or comprise the device of the first aspect. The UE may comprise the gateway controller, and the UE may be a vehicle. The device of the first aspect enables, in particular, a HW-driven gatewaying approach. However, the device may be SDN compliant as well. The device is scalable in terms of geometry, e.g., the number of ingress and egress ports may be increased in the future, and different kind of network protocols can be added easily. Further, the device is scalable in terms of features, e.g., various kind of functionalities may be added and embedded across its system/hardware architecture, for example, as shown in FIG. 6.

In an implementation form of the first aspect, the set of frame formats comprises one or more frame formats according to the following protocols: CAN, CAN FD, CAN XL, LIN, FlexRay, Media Oriented System Transport (MOST), Ethernet, MIPI Camera Serial Interface 2.

These are just examples of frame formats that the device of the first aspect may handle. Other frame formats may be possible, and new frame formats may be added in the future.

In an implementation form of the first aspect each normalized frame comprises a plurality of fields, wherein each field is parameterized by a field index or offset parameter and a field size parameter.

Any network frame may be considered a bitstream organized in a certain number of fields of different sizes, each field having a different and particular meaning at application level. The fields may be distributed in different positions along the data frame. From this perspective, any frame can be managed in a standardized way independently of its original nature.

In an implementation form of the first aspect, each normalized frame comprises a header, a payload, and a trailer, and the payload of each normalized frame comprises the respective ingress frame.

Thus, the ingress frame may be transported in a normalized frame. Independently of the type of ingress frame, the normalized frame may thus be handled by one or more processing stages of the gateway controller.

In an implementation form of the first aspect, each normalized frame comprises an instruction frame in a control plane and a data frame in a data plane, wherein the data frame comprises the respective ingress frame.

In an implementation form of the first aspect, the instruction frame comprises a header, a payload, and a trailer, and the payload of the instruction frame comprises an instruction that indicates how the data frame is processed in each of one or more processing stages of the processing circuitry.

The instruction frame and the data frame are thus separated, and the instruction frame may indicated—as metadata—how the data frame should be processed in one or more processing stages of the gateway controller.

In an implementation form of the first aspect, the instruction frame comprises a length of the instruction and one or more parameters of the instruction as metadata of the respective data frame.

In an implementation form of the first aspect, the header and payload of the instruction frame comprises one or more of: a port number or identifier (ID) where the respective ingress frame was received, a network type or protocol related to the respective ingress frame, a frame timestamp, a frame length, a frame priority, a number of bits of the normalized frame per clock, a counter of matches, a gateway command or action to be executed on the ingress frame.

Notably, the counter of matches may be filled in later, for example, in a matching and action stage.

In an implementation form of the first aspect, the trailer of the instruction frame comprises a CRC of the instruction or a CS of the instruction, or a PB of the instruction as integrity check mechanism applied to the entire instruction frame.

Thus, an integrity check mechanism can be applied, regardless of the ingress frame format.

In an implementation form of the first aspect, the processing circuitry comprises one or more ingress ports, each ingress port being configured to receive one or more ingress frames of a particular frame format according to a particular protocol of the multiple frame formats included in the set of frame formats.

The ingress ports may be scalable, that is, further ingress ports for further frame formats may be added to the processing circuitry. Thus, the device is scalable.

In an implementation form of the first aspect the processing circuitry further comprises a set of registers, and the set of registers is configurable with a set of parameters for relating each of the one or more ingress ports to one or more networking features and/or protocols to be applied to the one or more ingress frames received at that ingress port to normalize the ingress frames.

This allows easy configuration of the device of the first aspect. The device of the first aspect thus enables a very flexible way for the gatewaying provided in HW.

In an implementation form of the first aspect the processing circuitry further comprises a first in, first out (FIFO) for each of the ingress ports, and each FIFO is adapted to receive and forward the bits of the one or more ingress frame received at that ingress port.

In an implementation form of the first aspect, the processing circuitry further comprises an instruction generator configured to construct the instruction frame for each respective ingress frame, wherein the instruction frame is constructed based on the respective ingress frame and the set of parameters for the ingress port where the respective ingress frame is received.

In an implementation form of the first aspect, the processing circuitry is further configured to write or store the data frame received at the ingress port in the FIFO in the data plane and at the same time to generate the instruction frame in the control plane.

In an implementation form of the first aspect, the processing circuitry is further configured to read the data frame stored in the FIFO in the data plane from the FIFO and at the same time read the instruction frame from the control plane, so that both frames are moved forward synchronously to the next one or more processing stages of the processing circuitry.

A second aspect of this disclosure provides a method for a gateway controller of a user equipment, the method comprising receiving one or more ingress frames of bits, wherein each ingress frame has one of multiple frame formats included in a set of frame formats, and converting each ingress frame into a normalized frame of bits, wherein each normalized frame has a normalized frame format.

In an implementation form of the second aspect, the set of frame formats comprises one or more frame formats according to the following protocols: CAN, CAN FD, CAN XL, LIN, FlexRay, MOST, Ethernet, MIPI, Camera Serial Interface 2.

In an implementation form of the second aspect each normalized frame comprises a plurality of fields, wherein each field is parameterized by a field index or offset parameter and a field size parameter.

In an implementation form of the second aspect, each normalized frame comprises a header, a payload, and a trailer, and the payload of each normalized frame comprises the respective ingress frame.

In an implementation form of the second aspect, each normalized frame comprises an instruction frame in a control plane and a data frame in a data plane, wherein the data frame comprises the respective ingress frame.

In an implementation form of the second aspect, the instruction frame comprises a header, a payload, and a trailer, and the payload of the instruction frame comprises an instruction that indicates how the data frame is processed in each of one or more processing stages of the processing circuitry.

In an implementation form of the second aspect, the instruction frame comprises a length of the instruction and one or more parameters of the instruction as metadata of the respective data frame.

In an implementation form of the second aspect, the header and payload of the instruction frame comprises one or more of: a port number or ID where the respective ingress frame was received, a network type or protocol related to the respective ingress frame, a frame timestamp, a frame length, a frame priority, a number of bits of the normalized frame per clock, a counter of matches, a gateway command or action to be executed on the ingress frame.

As described before, the counter of matches may be used in the matching and action stage.

In an implementation form of the second aspect, the trailer of the instruction frame comprises a CRC of the instruction or a CS of the instruction, or a PB of the instruction as integrity check mechanism applied to the entire instruction frame.

In an implementation form of the second aspect, the method comprises receiving, at each ingress port of one or more ingress ports, one or more ingress frames of a particular frame format according to a particular protocol of the multiple frame formats included in the set of frame formats.

In an implementation form of the second aspect, the method further comprises configuring a set of registers with a set of parameters for relating each of the one or more ingress ports to one or more networking features and/or protocols to be applied to the one or more ingress frames received at that ingress port to normalize the ingress frames.

In an implementation form of the second aspect, the method further comprises receiving and forwarding, by a FIFO for each of the ingress ports, the bits of the one or more ingress frame received at that ingress port.

In an implementation form of the second aspect, the method comprises constructing the instruction frame for each respective ingress frame, wherein the instruction frame is constructed based on the respective ingress frame and the set of parameters for the ingress port where the respective ingress frame is received.

In an implementation form of the first aspect, the method further comprises writing or storing the data frame received at the ingress port in the FIFO in the data plane and at the same time generating the instruction frame in the control plane.

In an implementation form of the first aspect, the method further comprises reading the data frame stored in the FIFO in the data plane from the FIFO and at the same time reading the instruction frame from the control plane, so that both frames are moved forward synchronously to the next one or more processing stages.

The method of the second aspect and its implementation forms achieve the same advantages described above for the device of the first aspect and its respective implementation forms.

A third aspect of this disclosure provides a computer program comprising a program code for performing the method according to the second aspect or any of its implementation forms, when executed on a processor.

A fourth aspect of this disclosure provides a non-transitory storage medium storing executable program code which, when executed by a processor, causes the method according to the second aspect or any of its implementation forms to be performed.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms will be explained in the following description of embodiments in relation to the enclosed drawings, in which:

FIG. 13 shows an example of memory map of the PDU normalizer (device according to an embodiment of this disclosure).

DETAILED DESCRIPTION OF EMBODIMENTS

Figure 3:
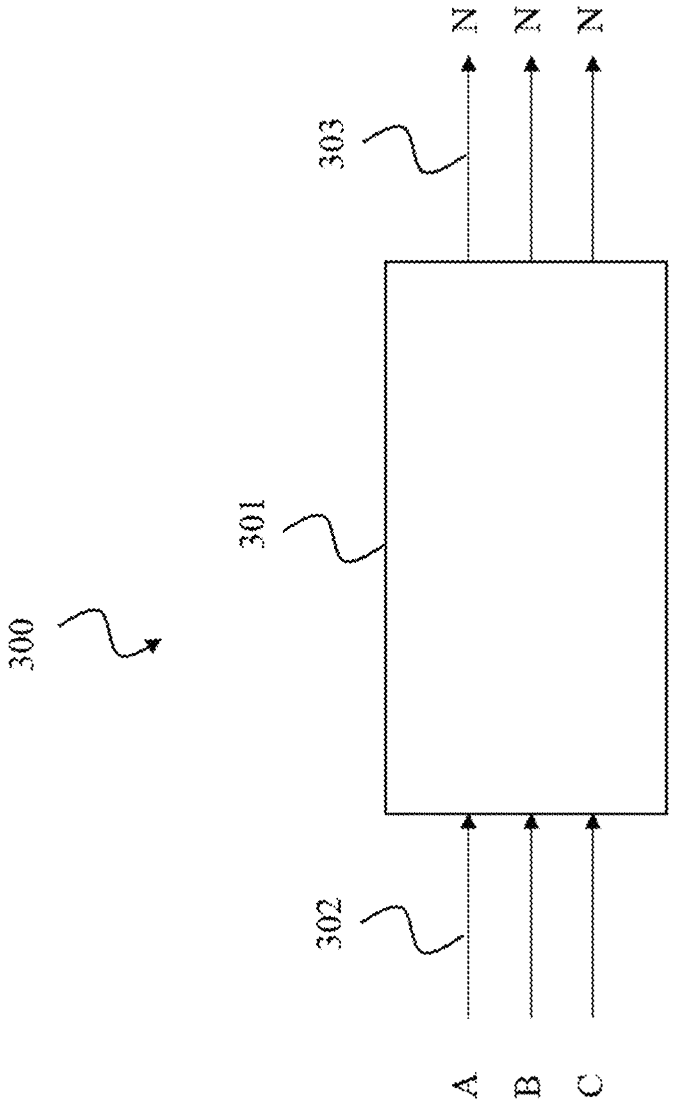
FIG. 3 illustrates generally a device according to an embodiment of this disclosure.

FIG. 3 shows schematically a general solution proposed by this disclosure to the above mentioned objectives and goals. In particular, FIG. 3 shows a device 300 according to an embodiment of this disclosure. The device 300 is usable in a gateway controller of a user equipment, e.g., of a vehicle. That is, the device 300 may be implemented in an automotive gateway controller. The device 300 may also be the automotive gateway controller. The device comprises processing circuitry 301. The processing circuitry 301 may comprise one or more processing stages of the gateway controller. The processing circuitry 301 may, however, also be one processing stage of the gateway controller (responsible for frame normalization) and the gateway controller may comprise additional processing circuitry to implement further processing stages.

The processing circuitry 301 is configured to perform, conduct or initiate various operations of the device 300, which are described in this disclosure. The processing circuitry 301 may comprise hardware and/or the processing circuitry 301 may be controlled by software. The hardware may comprise analog circuitry or digital circuitry, or both analog and digital circuitry. The digital circuitry may comprise components such as application-specific integrated circuits (ASICs), field-programmable arrays (FPGAs), digital signal processors (DSPs), or multi-purpose processors. The device 300 may further comprise memory circuitry, which may store one or more instruction(s) that can be executed by the processing circuitry 301, in particular, under control of software. For instance, the memory circuitry may comprise a non-transitory storage medium storing executable software code, which, when executed by the processing circuitry 301, causes various operations of the device 300 to be performed. In one embodiment, the processing circuitry 301 comprises one or more processors and a non-transitory memory connected to the one or more processors. The non-transitory memory may carry executable program code, which, when executed by the one or more processors, causes the device 300 to perform, conduct, or initiate the operations or methods described in this disclosure.

In particular, the processing circuitry 301 is configured to receive one or more ingress frames 302 of bits. Each ingress frame may comprises multiple bits that are organized into multiple fields having different meaning. An ingress frame may be a PDU. Each ingress frame 302 has one of multiple frame formats (illustrated schematically as A, B, C in FIG. 1), wherein these multiple frame formats included in a set of frame formats. The set of frame formats may, in particular, comprise one or more frame formats according to the following protocols (see also FIG. 1): CAN 102, CAN FD 103, CAN XL 104, LIN 101, FlexRay 105, MOST, Ethernet 106, MIPI Camera Serial Interface 2.

The processing circuitry 301 of the device 300 is further configured to convert each ingress frame 302 into a normalized frame 303 of bits. Each normalized frame 303 has a normalized frame format (illustrated schematically as N). Each normalized frame may include multiple bits—including the bits of the respective ingress frame—which are organized into fields of different size and meaning. The number of bits, number of fields, meaning of fields, size of fields etc. differs between the ingress frame format and the normalized frame format.

Accordingly, the device 300—based on the processing circuitry 301—is configured to function as a frame normalizer, in particular, may function as a PDU normalizer. The normalized frames 303 may be provided to a next processing stage of the gateway controller.

Figure 1:
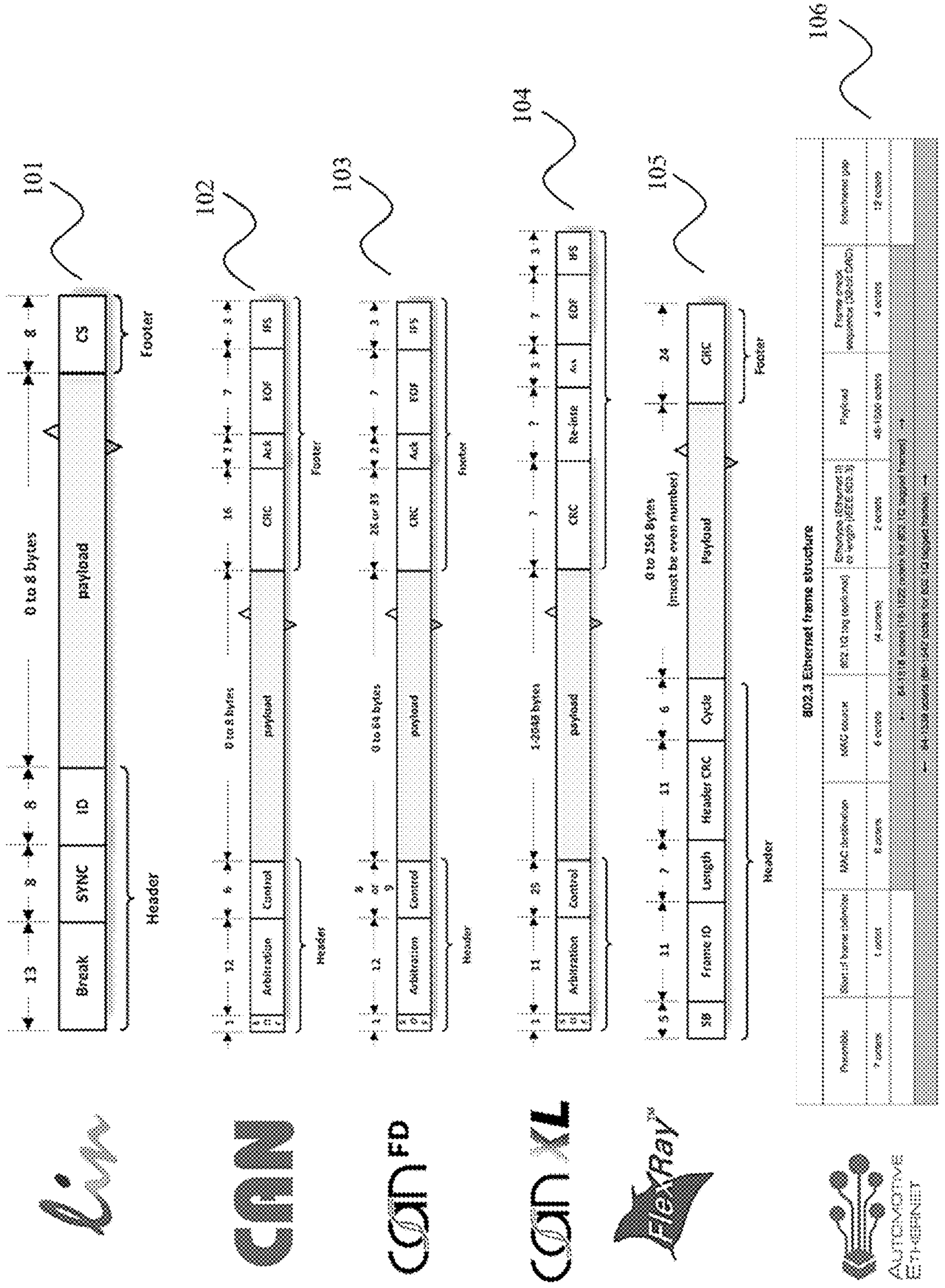
FIG. 1 illustrates a heterogeneity of (automotive) networking technologies and protocols.
Figure 2:
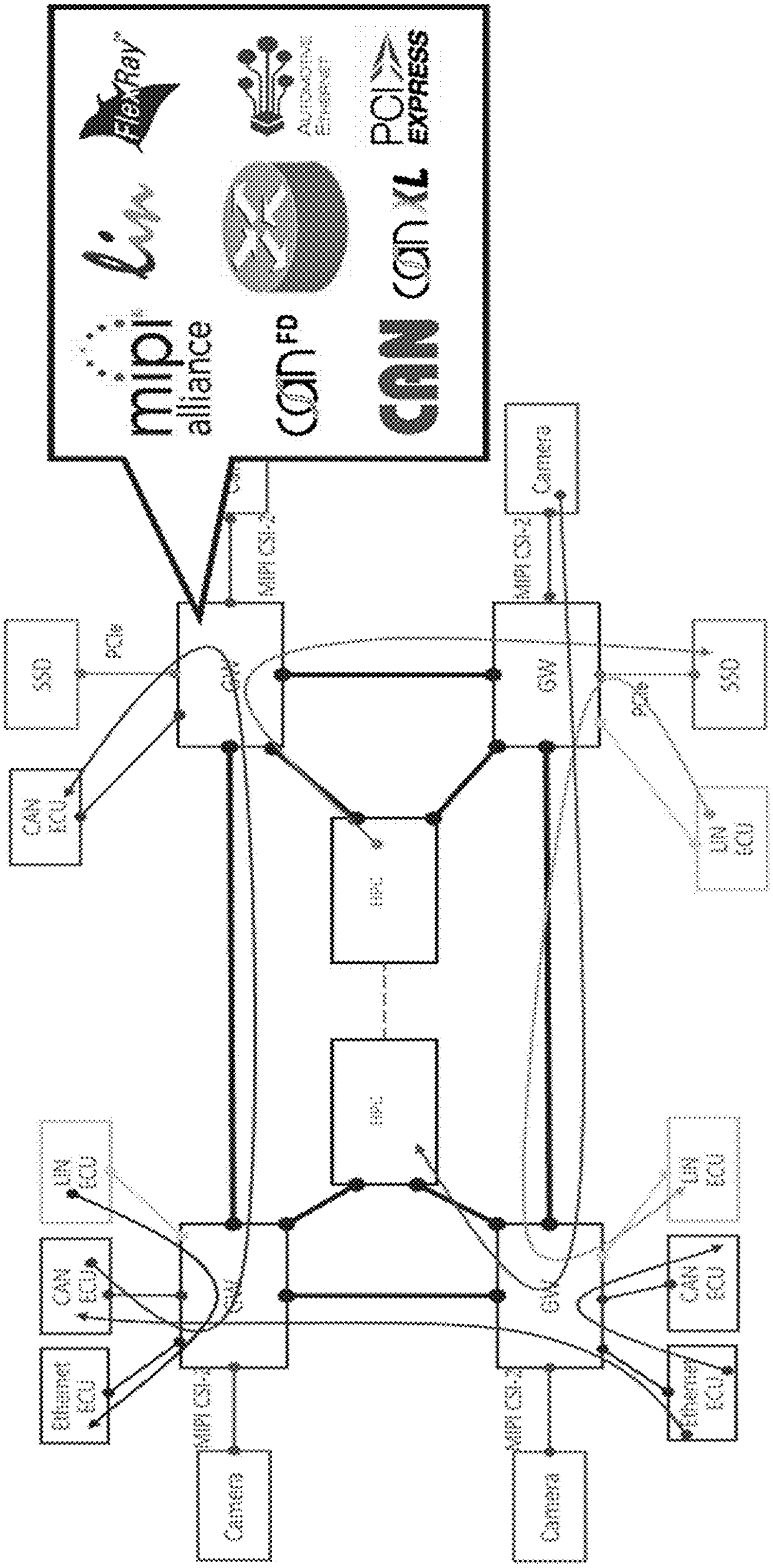
FIG. 2 depicts a handling of frames (PDUs) inside a conventional gateway controller across different networks.

Advantageously, a gap of network & communication systems can be filled by developing a new gateway controller architecture based on the device 300 shown in FIG. 1. The new gateway controller architecture may bring a better level of design granularity to reach a better performance in key performance indicators (KPIs), like latency, jitter, throughput, and cost-effectiveness based on the all-in-one approach, i.e., the development of a common processing unit able to manage different networking frames or protocols at the same time instead of developing a dedicated processing unit per each network frame. This may take the architecture of complex networking systems and products, which merge heterogeneous networking protocols, to the next level.

In the following, more detailed embodiments of this disclosure, and also considerations that led to the embodiments of this disclosure, are described.

Figure 4:
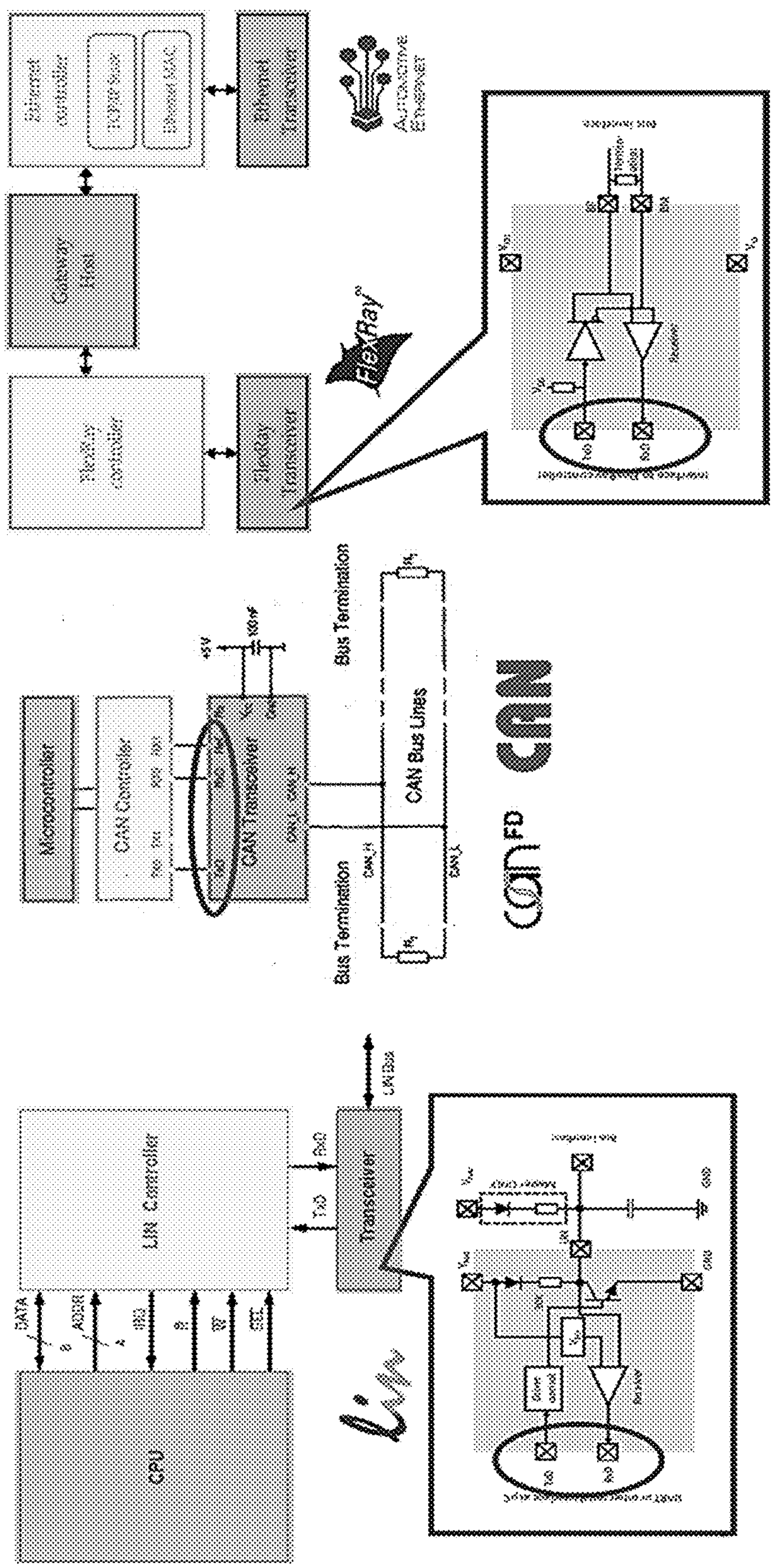
FIG. 4 shows a CPU, a network controller, and a transceiver/physical layer (PHY) networking stack of a conventional network processor or gateway.

The frame normalization enabled by the device 300 is based on the fact that every network technology/protocol manages layers 2 and above of the OSI model with a specific controller or logic (of course based on a different layer 1 or PHY technology). This is exemplarily depicted in FIG. 4 for a conventional gateway.

Based on this fact, an idea on which embodiments of this disclosure are based, is to somehow replace the protocol-specific network controller by a new gateway controller that is valid for any networking protocol. That is, to try to normalize or standardize the processing, in order to make it invariant to the network protocol. The idea is then to bring a new level of abstraction to the network architect, which is referred to as the "frame normalization" in this disclosure.

Figure 5:
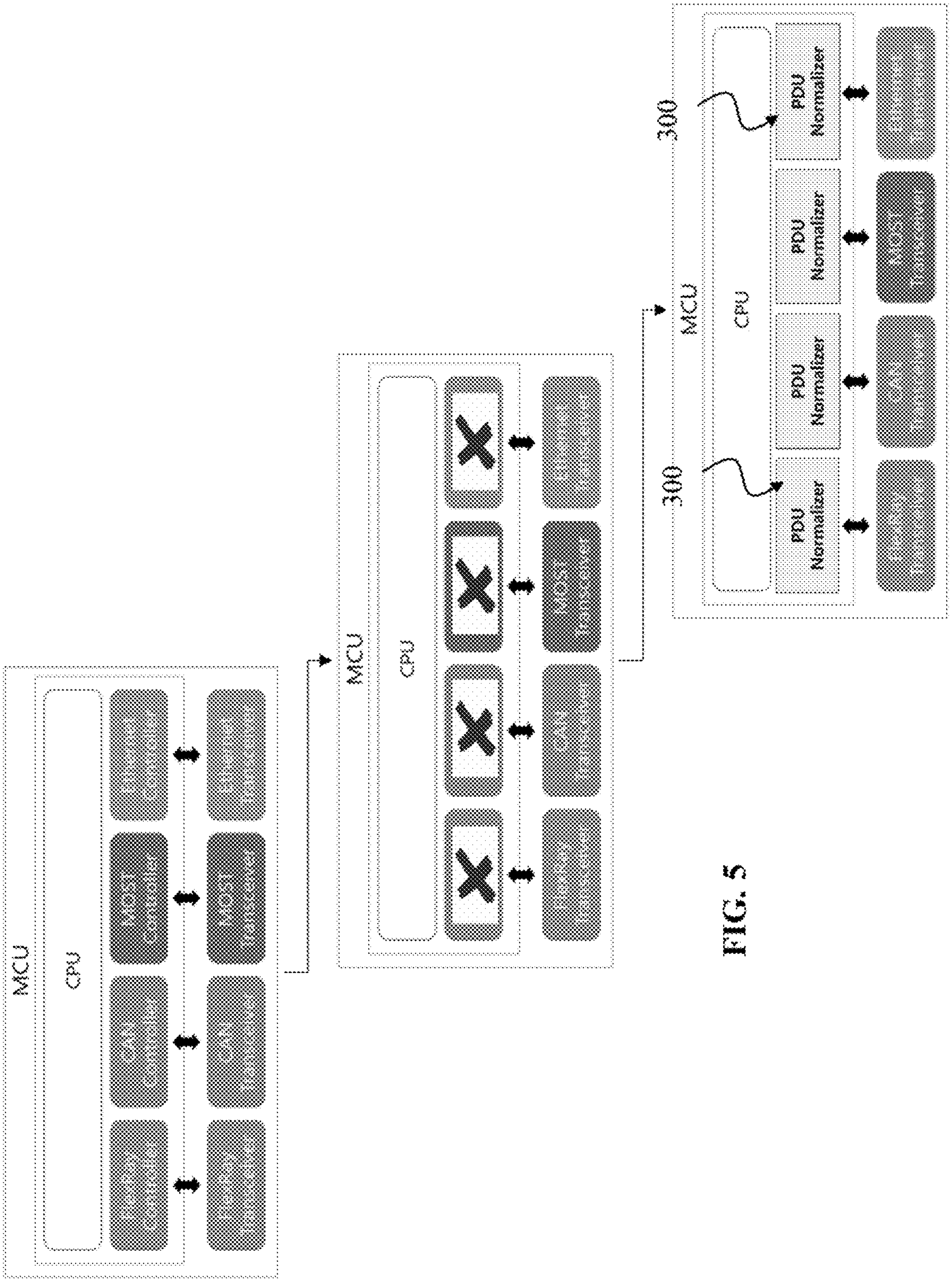
FIG. 5 shows a concept of the present disclosure regarding the processing of an automotive gateway using a normalization stage (i.e., including a device according to an embodiment of the disclosure).

The frame normalization concept of this disclosure is schematically illustrated in FIG. 5 The concept consists in developing a new HW peripheral or coprocessor that may be embedded in a network SoC device and that takes the role of normalizing the ingress frames—coming from whatever ingress port of the automotive gateway controller—independently of their nature and/or protocol (e.g., CAN, LIN, FlexRay, Ethernet, etc., see above). The main advantage of such a new processing stage introduced in the gateway controller is the fact that this stage can be stated as a standard processing synthesized in a common way, instead of synthesizing different kinds of controllers that each depend on the nature of the ingress ports of the gateway controller.

Based on this ideas, the device 300 is provided. Further, on the basis of this device 300, a next-generation automotive gateway controller 600 is proposed as a very flexible, modular, and adaptable system. Just for this reason, this concept is also named elastic gateway controller 600. The architecture, or high level design, of an automotive gateway controller 600 aligned with embodiments of this disclosure is shown in FIG. 6.

Figure 6:
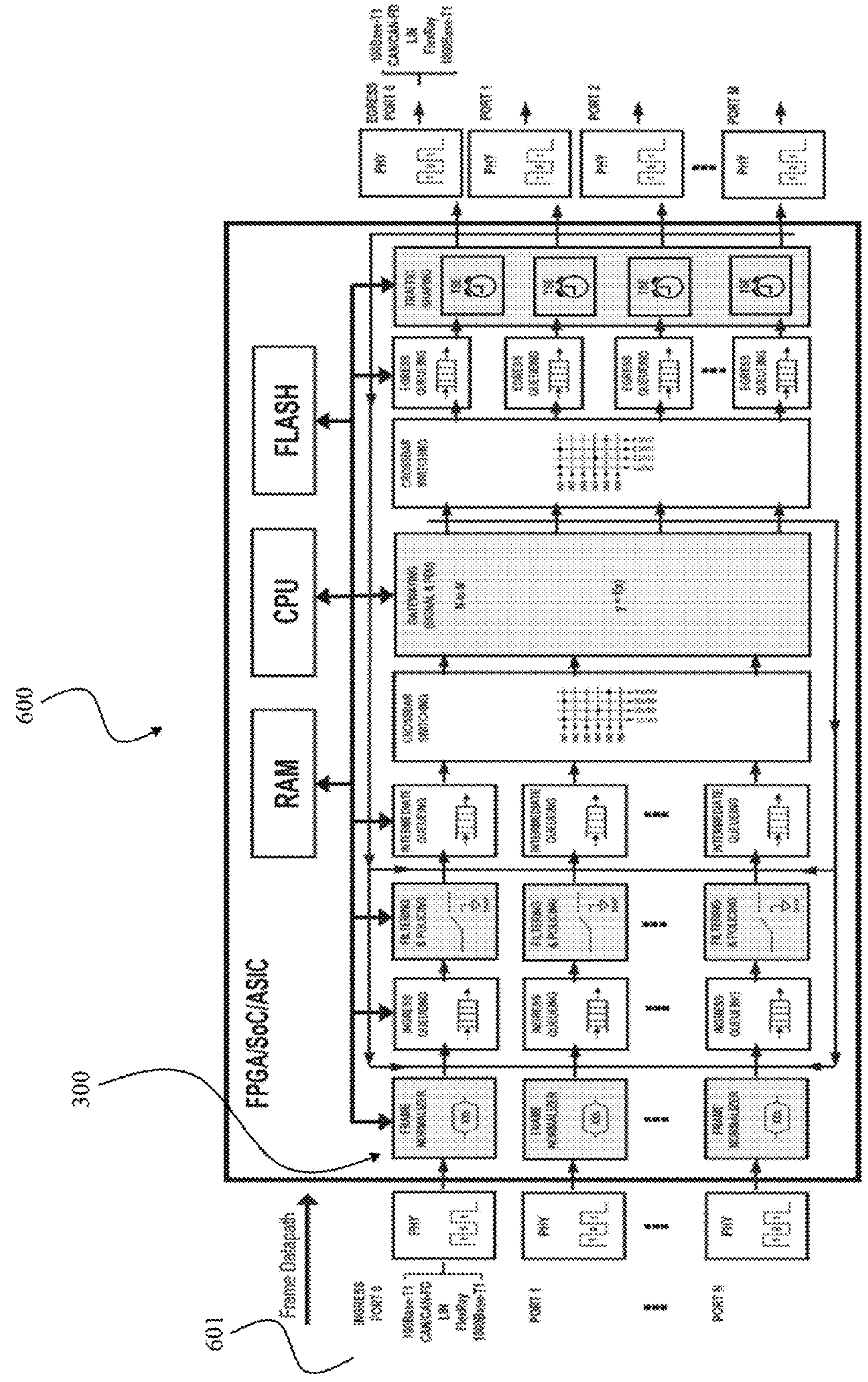
FIG. 6 shows a system architecture of an automotive gateway controller, which includes a device according to an embodiment of the present disclosure.

The gateway controller architecture shown in FIG. 6 is oriented to exploit both hardware parallelism and pipelining strategies, based on a sequential and ultra-fast ingress-to-egress data path, targeting to optimize the processing latency of every frame. As shown in FIG. 6, the functional architecture of the automotive gateway controller 600 can be decomposed, at a first level of abstraction, into a sequence of processing stages deployed in HW by means of dedicated and reconfigurable coarse-grained functional blocks, apart from the CPU interaction, giving rise to a data path for the frames from ingress to egress ports:

- Frame normalization (e.g., implemented by the device 300 as indicated in FIG. 6).
- Ingress queueing.
- Filtering & policing.
- Intermediate queueing & crossbar switching.
- Gatewaying.
- Crossbar switching & egress queueing.
- Traffic shaping.

The functions embedded in the main HW blocks that compose the full data path of the gateway in FIG. 6 are detailed next.

Frame Normalization: the device 300 is responsible for normalizing the ingress frame 302 so that it is seen internally as an OSI layer 2 standard frame (normalized frame 393), invariant to/independent of its network nature or protocol (e.g. LIN, CAN 2.0, CAN-FD, FlexRay, 100BaseT1, 1000BaseT1, see also above), i.e., is a simple stream of bits organized in a set of data fields. Every field may have a particular meaning. Thus, this functional block based on the device 300 is able to process ingress frames 302 of whatever kind by interpreting them as a sequence of data fields, or words, with a particular meaning that depends on an internal codification based on its type of network and/or protocol. This codification may be performed by the host CPU of the system, as for instance shown in FIG. 6, by writing a set of configurable registers allocated in the frame normalizer peripheral.

Ingress Queueing: a FIFO memory may be used as buffering between the frame normalization stage (device 300) and the next processing stage. From the architectural perspective, this may allow to create two different clock domains or processing stages running at different speeds and internal bus sizes, controlling thus the bandwidth and throughput of each processing stage.

Filtering & Policing: this block may be used for performing filtering, classification and monitoring actions on the ingress frames 302 basically based on a rules-based matching engine for both header and payload of the frame 302. This matching process may be shared in many of the operations performed in a gateway controller: from frames filtering like access control list (ACL) to the execution of a security stateful firewall and an intrusion detection system with regular expression search.

Intermediate Queueing: a FIFO memory may be used as buffering between the filtering & policing stage and the next processing stage. From the architectural perspective, this may allow creating two different clock domains or processing stages running at different speeds and internal bus sizes, controlling thus the bandwidth and throughput of each processing stage.

Gatewaying: this block may be used for performing most of the gatewaying actions of the gateway electronic control unit (ECU), just the actions related to the matching performed in the previous filtering & policing stage, from Time-Sensitive Networking (TSN) standards, to routing/forwarding actions, frame generator or encapsulation/aggregation and gatewaying/tunneling of frames, among many others.

Egress Queueing: a FIFO memory may be used as buffering between the gatewaying stage and the next processing stage. From the architectural perspective, this may allow creating two different clock domains or processing stages running at different speeds and internal bus sizes, controlling thus the bandwidth and throughput of each processing stage.

Traffic Shaping: this block may be responsible for the arbitration and scheduling of the egress frames based on different policies or priorities (time aware shaping, credit based shaping, frame preemption, etc.).

The data path and the set of functions shown in FIG. 6 are proposed as the right building blocks needed to compose whatever scalable automotive gateway that any original equipment manufacturer (OEM) could demand.

In order to standardize the computation of the different internal stages of the gateway controller 600, a new gateway processing protocol may be used through the definition and handling of a command or instruction in each processing stage. The format of this instruction may be based on a control frame (or instruction frame 801, see FIGS. 8 and 9), which may be composed of instruction frame fields distributed through header 901, payload 902, and trailer 903, and which are shifted from a building block to the next one in the data path. The header 901 may collect global information of the instruction, while the payload 902 may refer to parameters of the instruction related to every processing stage. Finally, the trailer 903 of the instruction frame 801 may provide an integrity check of the instruction frame 801 through, for instance, a CRC or CS computation. This approach is compliant with the SDN concept, wherein the network processing gets split in control plane and data plane.

Figure 7:
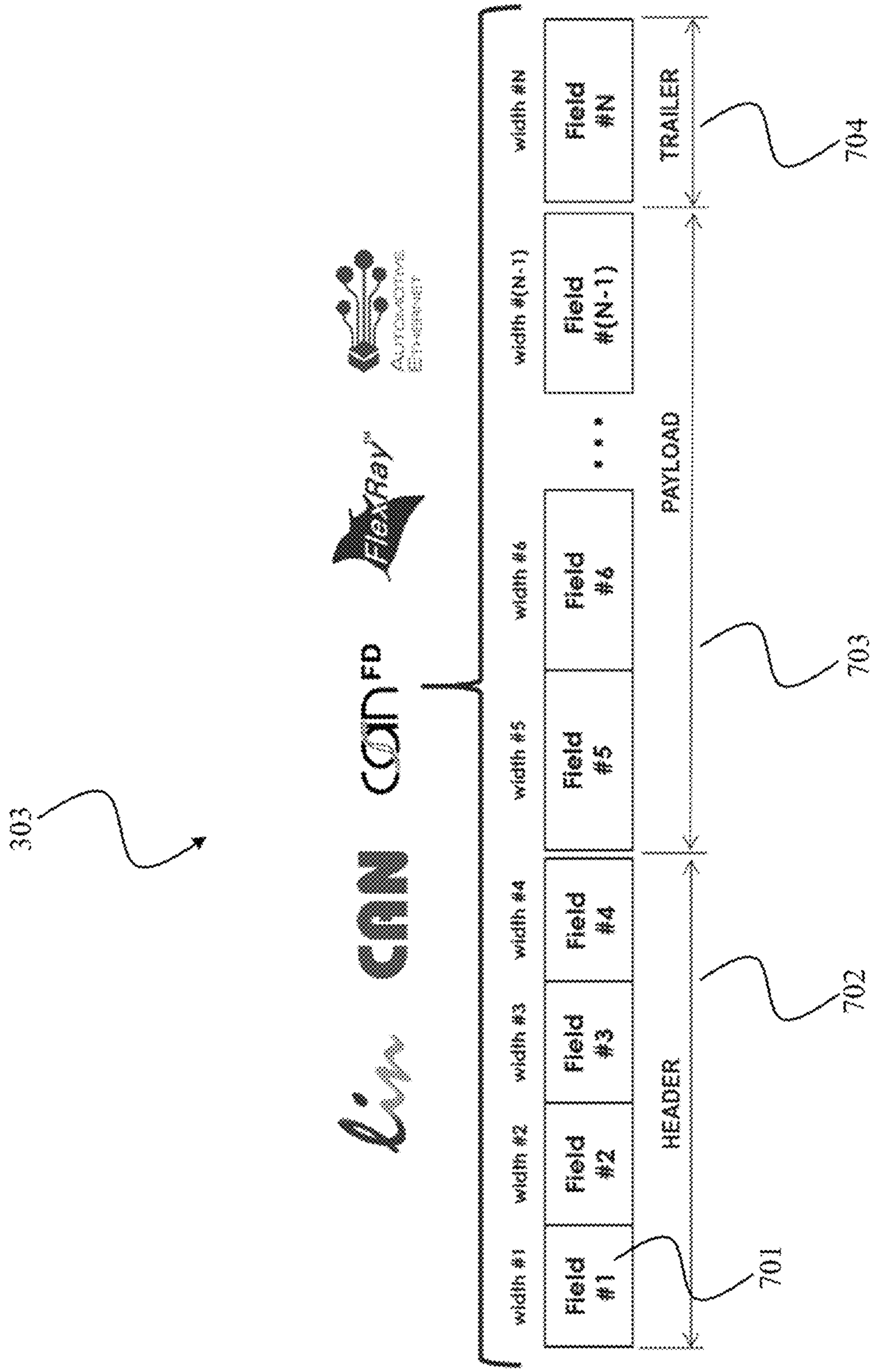
FIG. 7 illustrates a frame (PDU) normalization strategy proposed by this disclosure.

The explanation above is the ground for the normalization strategy for the heterogeneous network frames implemented by the device 300, for instance, in an automotive gateway controller. FIG. 7 depicts a normalized frame 303. At a conceptual level, whatever network ingress frame 302, can be seen as a bitstream organized in certain number of fields of different sizes, each one with a different and particular meaning at application level and distributed in different positions along the data ingress frame 302. That abstraction step may provide the basis for the normalization.

Likewise, also the normalized frame 303 shown in FIG. 7 may comprise fields 701 that may be distributed over a header 702, payload 703 (which may comprise the ingress frame 302), and trailer 704. Each field 701 can be parameterized by a field index or offset parameter and a field size parameter. From this new perspective of the normalized frame 303, any ingress frame 302 can be managed by the device 300 and subsequently the gateway controller 600 in a standardized way independently of its original nature.

It is important to highlight here that this normalization may be enabler by providing the device 300 with a set of parameters in the way of configurable registers 805 (see e.g., FIG. 8), which may be instantiated inside the HW peripheral to allow the system architect or developer to configure each ingress port 601 of the device 300 (and accordingly of the gateway controller 601, see FIG. 6). Each ingress port 601 may be configured to receive one or more ingress frames 302 of a particular frame format according to a particular protocol of the multiple frame formats included in the set of frame formats.

Figure 8:
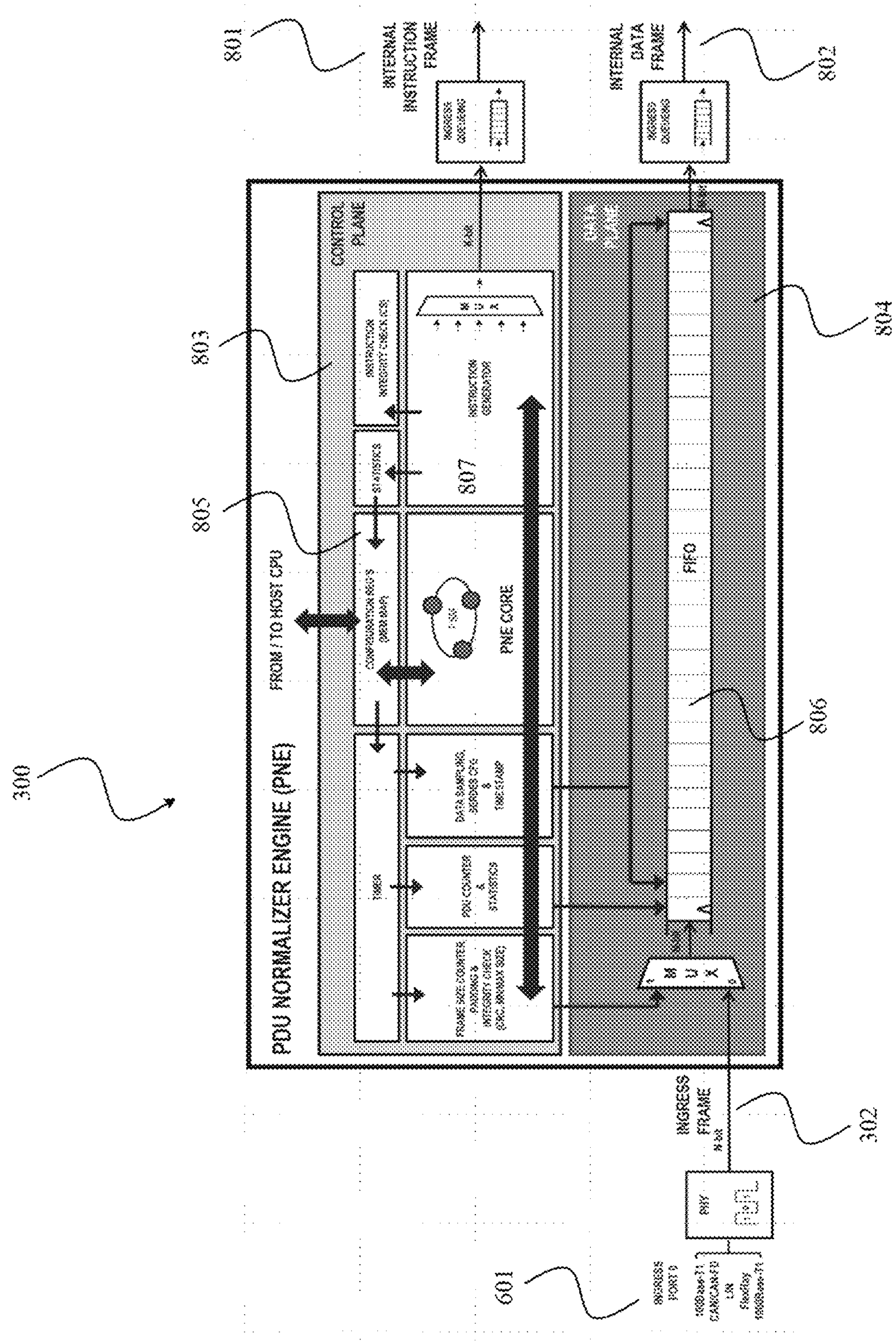
FIG. 8 shows a microarchitecture of a frame (PDU) normalizer (i.e., of a device according to an embodiment of this disclosure).

As shown in FIG. 6, the device 300 may be the first processing stage of the gateway controller. A device 300 according to an embodiment of this disclosure is shown in FIG. 8. The device 300 of FIG. 8 builds on the device 300 shown in FIG. 3. Same elements are labelled with the same reference signs and may be implemented in an identical manner.

In particular, a possible microarchitecture of the device 300 is shown in FIG. 8. The design of the device 300 may follow the SDN approach with the ingress frame 302 coming from the ingress port 601 being handled as a data frame 802 in the data plane 804 and an instruction frame 801, composed by the metadata of that ingress frame 302, processed in the control plane 803.

As shown in FIG. 8, the device 300 (its processing circuitry 301) may comprise a set of registers 805. The set of registers 805 is configurable with a set of parameters for relating each of the one or more ingress ports 601 to one or more networking features and/or protocols to be applied to the one or more ingress frames 302 received at that ingress port 601, in particular, to normalize the ingress frames 302.

Further, the device 300 (its processing circuitry 301) may further comprise a FIFO 806 for each of the ingress ports 601. Each FIFO 806 may be adapted to receive and forward the bits of the one or more ingress frames 302 received at that ingress port 601. The device 300 is configured to write or store the data frame 802 related to the ingress frame 302 received at the ingress port 601 in the FIFO 806 in the data plane 804, and at the same time to generate the instruction frame 801 in the control plane 803 based on the metadata of the ingress frame 302.

The device 300 (its processing circuitry 301) may also comprise an instruction generator 807, which is configured to construct the instruction frame 801 for each respective ingress frame 302. The instruction frame 801 may be constructed based on the respective ingress frame 302 and the set of parameters for the ingress port 601 (configured in the register(s) 805), where the respective ingress frame 302 is received.

The device 300 may additionally be configured to read the data frame 802 stored in the FIFO 806 and at the same time read the instruction frame 801, so that both frames 801, 802 are moved forward synchronously to the next one or more processing stages of the device 300 (or the gateway controller 600).

Figure 9:
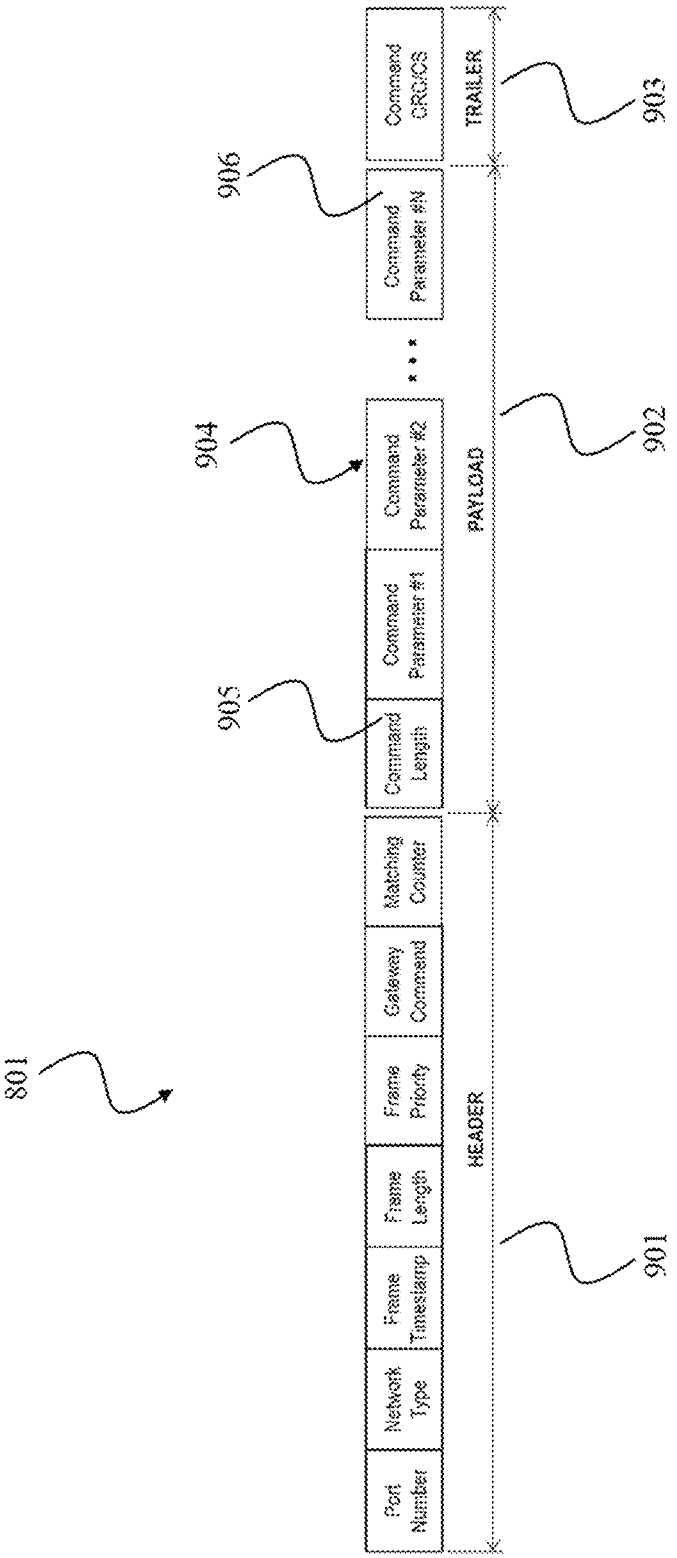
FIG. 9 shows an instruction frame format of the gateway processing in this disclosure.

FIG. 9 shows an exemplary instruction frame 801 used by the device 300. The instruction frame 801 comprises a header 901, a payload 902, and a trailer 903. The payload 902 of the instruction frame 801 comprises an instruction 904, which indicates how the data frame 802 is processed in each of one or more processing stages of the processing circuitry 301 or gateway controller 600 (see FIG. 6).

The header 901 and payload 902 of the instruction frame 801 may comprise one or more of: a port number or ID where the respective ingress frame 302 was received, a network type or protocol related to the respective ingress frame 302, a frame timestamp, a frame length, a frame priority, a number of bits of the normalized frame per clock, a counter of matches, a gateway command or action to be executed on the ingress frame 302.

The trailer 903 of the instruction frame 801 may comprise a CRC of the instruction 904 or a CS of the instruction 904, or a PB of the instruction 904. This may provide an integrity check mechanism applied to the entire instruction frame 801.

In the gateway controller 600, the internal instruction frame 801 may be handled through a control bus that is shifted through the different modular processing stages of the gateway controller 600 in parallel and synchronously to every network frame in FIG. 6. The instruction 94 may obey to a new internal gateway processing protocol defined by means of data fields detailed in FIG. 9.

Figure 10:
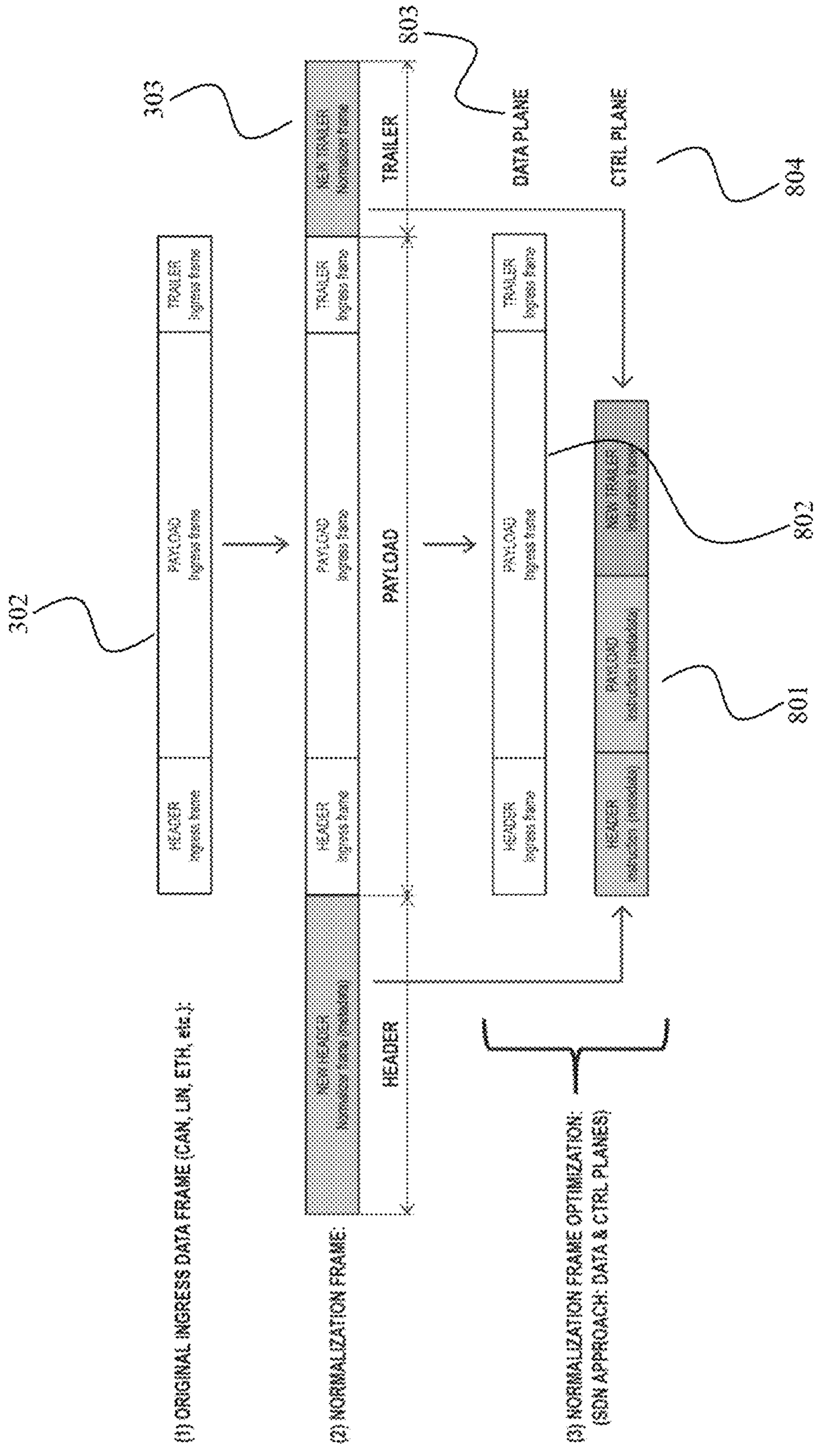
FIG. 10 shows a composition of an instruction frame used proposed by this disclosure.

FIG. 10 shows a composition of the instruction frame 801 from the ingress frame 302. The ingress frame 302 comprises header, payload, and trailer. The normalized frame 303 may also comprise header 702, payload 703, and trailer 704 as shown in FIG. 7. The normalized frame 303 may be distinguished into the data frame 802 in the data plane 803, and the instruction frame 801 in the control plane 804. The instruction frame 801 may be constructed based on the respective ingress frame 302 and the set of parameters for the ingress port 601 where the respective ingress frame 302 is received.

Figure 11:
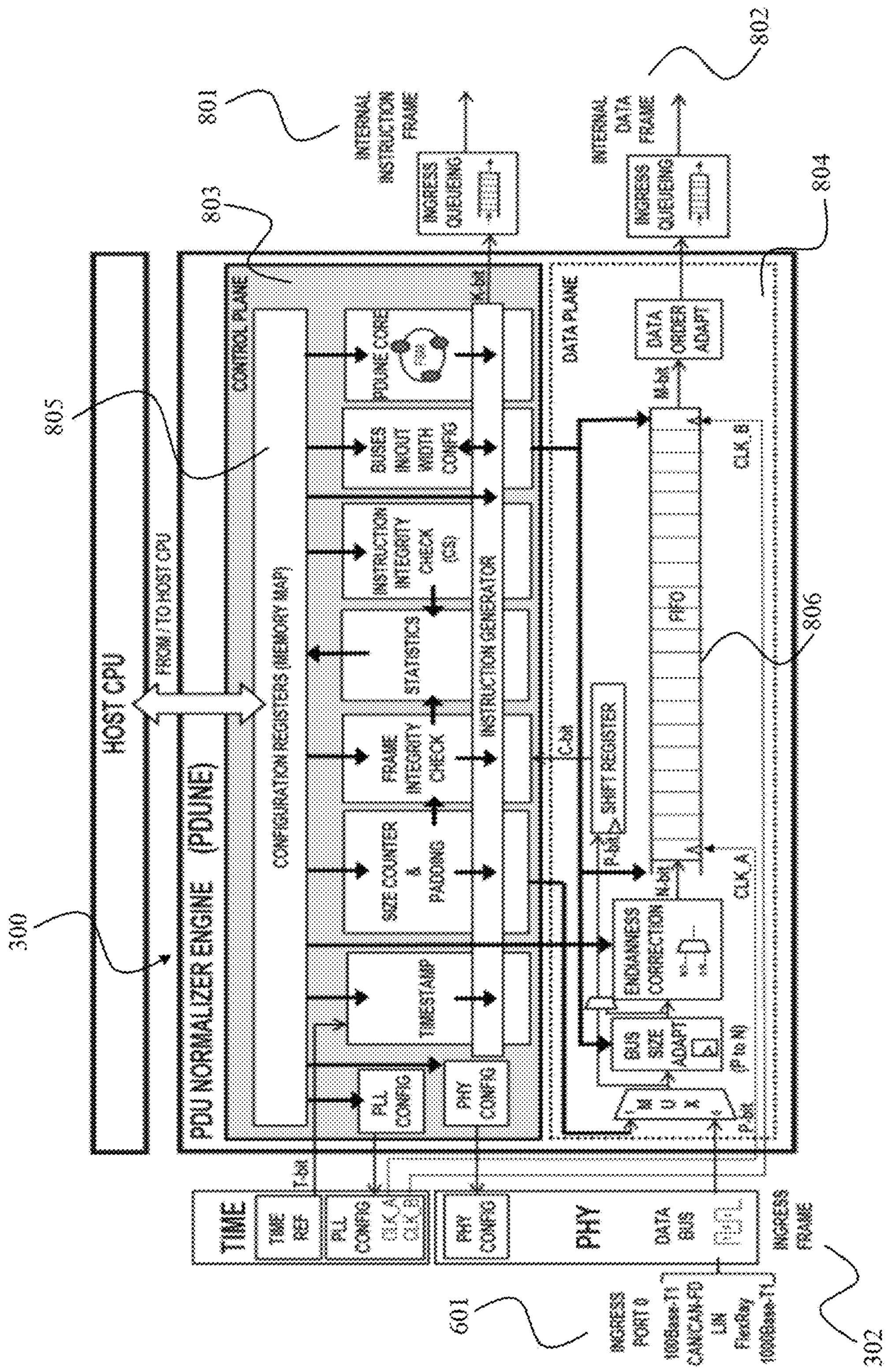
FIG. 11 illustrates a frame (PDU) normalizer engine microarchitecture (i.e., a device according to an embodiment of this disclosure).
Figure 12:
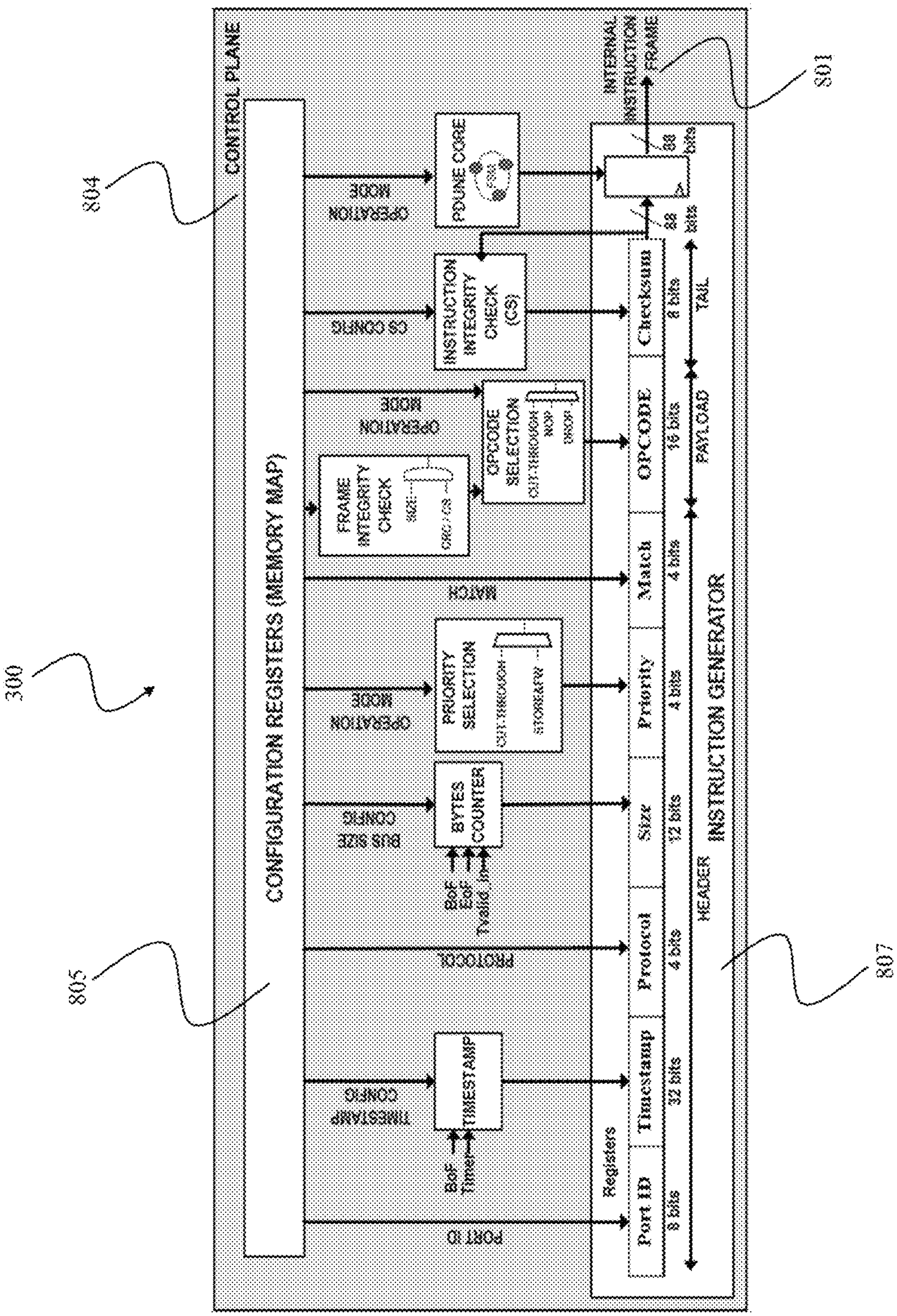
FIG. 12 illustrates instruction generation as part of the frame (PDU) normalization process proposed by this disclosure.

FIGS. 11, 12, and 13 show an example of a PDU normalizer engine (device 300), and its set of configurable parameters.

In particular, FIG. 11 shows that the PDU normalizer engine (similar to the device 300 shown in FIG. 8 but with further level of detail), operates in control plane 803 (on the instruction frame 801) and the data plane 804 (on the data frame 802). The PDU normalizer engine comprises one or more configuration registers 805, wherein parameters can be set to configure each of one or more ingress ports 601. To this end, the registers 805 may be connected to the host CPU. At each ingress port 601 a particular frame format may be handled. That is, ingress frames 302 of a specific frame format are received. The PDU normalizer engine also comprises the FIFO 806 to move the data frame 802 related to the ingress frame 302.

FIG. 12 illustrates an instruction generation as part of the normalization process performed by the device 300. The instruction generator 807 is responsible for filling in all the fields of the instruction frame 801 linked to each ingress frame 302. Every field of the instruction 904, allocated in the header 901, payload 902, and trailer 903, may be filled in by either direct data coming from the configuration registers 805 set by the architect/programmer or computed at run time (on the fly) by the HW blocks of the instruction generator 807 based on the data frame 802 received through the ingress port 601.

FIG. 13 illustrates an exemplary memory map of the PDU normalizer engine, in particular, a set of configurable registers 805 of the PDU normalizer engine organized in words of a specific size. Every configurable register 805 describes a set of parameters that configure the physical geometry (e.g. bus size, FIFO size, etc.) and behavior (e.g. padding, integrity check, etc.) of the PDU normalizer engine.

Figure 14:
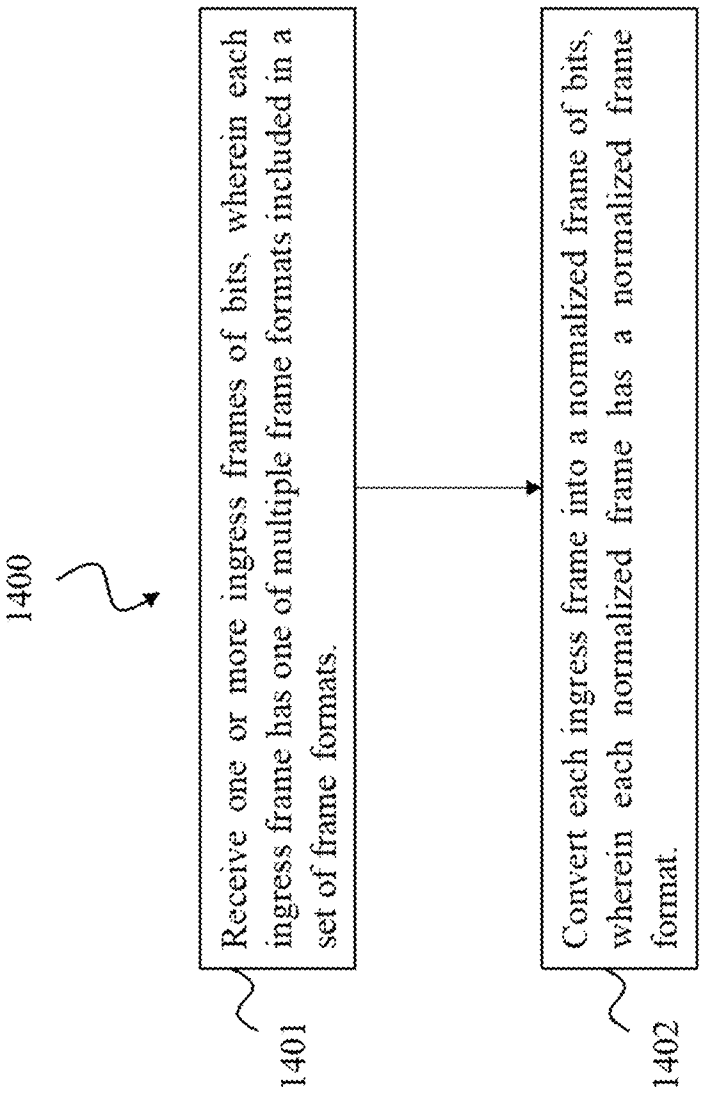
FIG. 14 shows a method according to an embodiment of this disclosure.

FIG. 14 shows a method 1400 according to an embodiment of this disclosure. The method 1400 may be performed by the device 300 or by the gateway controller 600. In any case, the method 1400 is suitable for a gateway controller 600 of a UE, for instance, a vehicle. The method 1400 comprises a step 1401 of receiving one or more ingress frames 302 of bits, wherein each ingress frame 302 has one of multiple frame formats A, B, C included in a set of frame formats. Further, the method 1400 comprises a step 1402 of converting 1402 each ingress frame 302 into a normalized frame 303 of bits, wherein each normalized frame 303 has a normalized frame format N.

In summary, this disclosure proposes a new methodology, based on the device 300, to build physical Gateway ECUs embedding the set of functionality required and specified by the user through the HW/SW co-design of such functions. Like this, part of this functionality may be implemented in SW to run on a CPU, and another part may be synthesized in HW in the way of coprocessors, peripherals or HW engines interconnect to the system-on-chip or microcontroller where the full gateway ECU application is integrated, as shown in FIG. 6. For such a goal, the frame normalization performed by the device 300 is a novel and key stage of this process.

The present disclosure has been described in conjunction with various embodiments as examples as well as implementations. However, other variations can be understood and effected by those persons skilled in the art and practicing the claimed matter, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. An apparatus comprising:
processing circuitry configured to:
receive one or more ingress frames of bits, wherein each of the one or more ingress frames has one of multiple frame formats comprised in a set of frame formats; and
convert each of the one or more ingress frames into a normalized frame of bits, wherein the normalized frame has a normalized frame format, wherein the normalized frame comprises an instruction frame in a control plane and a data frame in a data plane, wherein the data frame comprises a corresponding ingress frame, and wherein the instruction frame comprises an instruction to process the data frame in each of one or more processing stages of the processing circuitry.

2. The deviceapparatus of claim 1, wherein the multiple frame formats are based on the following protocols:
Controller Area Network (CAN);
CAN Flexible Data Rate;
CAN XL;
Local Interconnect Network (LIN);
FlexRay;
Media Oriented System Transport (MOST);
Ethernet;
Mobile Industry Processor Interface (MIPI); or
Camera Serial Interface 2.

3. The apparatus of claim 1, wherein the normalized frame comprises a plurality of fields, and wherein each of the fields is parameterized by a field index or by an offset parameter and a field size parameter.

4. The apparatus of claim 1, wherein the normalized frame comprises a header, a payload, and a trailer, and wherein the payload comprises the corresponding ingress frame.

5. The apparatus of claim 1, wherein the instruction frame comprises a header, a payload, and a trailer.

6. The apparatus of claim 5, wherein the payload comprises the instruction to process the data frame in each of the one or more processing stages of the processing circuitry.

7. The apparatus of claim 6, wherein the instruction frame further comprises a length of the instruction and one or more parameters of the instruction as metadata of the data frame.

8. The apparatus of claim 6, wherein the header and the payload comprise one or more of:
a port number or a port identifier (ID) from which the corresponding ingress frame was received;
a network type or protocol related to the corresponding ingress frame;
a frame timestamp;
a frame length;
a frame priority;
a number of bits of the normalized frame per clock;
a counter of matches; or
a gateway command or action to be executed on the corresponding ingress frame.

9. The apparatus of claim 6, wherein the trailer comprises a cyclic redundancy check (CRC) of the instruction, a checksum (CS) of the instruction, or a parity bit (PB) of the instruction as an integrity check mechanism of the instruction frame.

10. The apparatus of claim 1, wherein the processing circuitry comprises one or more ingress ports, wherein each of the one or more ingress ports is configured to receive the one or more ingress frames, and wherein a frame format of each of the one or more ingress frames is according to a protocol of the multiple frame formats.

11. The apparatus of claim 10, wherein the processing circuitry further comprises a set of registers configurable with a set of parameters for relating each of the one or more ingress ports to one or more networking features or protocols to be applied to one or more second ingress frames received at a corresponding ingress port to normalize the one or more second ingress frames.

12. The apparatus of claim 10, wherein the processing circuitry further comprises a first in, first out (FIFO) memory for each of the one or more ingress ports, and wherein the FIFO memory is configured to:
receive bits of one or more second ingress frames received at a corresponding ingress port; and
forward the bits of the one or more second ingress frames.

13. The apparatus of claim 10, wherein the processing circuitry further comprises an instruction generator configured to construct the instruction frame for the corresponding ingress frame based on the corresponding ingress frame and a set of parameters for an ingress port from which the corresponding ingress frame is received.

14. The apparatus of claim 10, wherein the processing circuitry is further configured to:

write or store the data frame received at a corresponding ingress port in a first in, first out (FIFO) memory in the data plane; and concurrently generate the instruction frame in the control plane.

15. The apparatus of claim 14, wherein the processing circuitry is further configured to:

read the data frame from the FIFO memory;

concurrently read the instruction frame from the control plane; and synchronously forward the data frame and the instruction frame to a next one or more processing stages of the processing circuitry.

16. A method comprising:

receiving one or more ingress frames of bits, wherein each of the one or more ingress frames has one of multiple frame formats comprised in a set of frame formats; and converting each of the one or more ingress frames into a normalized frame of bits, wherein the normalized frame has a normalized frame format, wherein the normalized frame comprises an instruction frame in a control plane and a data frame in a data plane, wherein the data frame comprises a corresponding ingress frame, and wherein the instruction frame comprises an instruction to process the data frame in each of one or more processing stages.

17. A computer program product comprising computer-executable instructions that are stored on a non-transitory computer-readable medium and that, when executed by one or more processors, cause a device to:

receive one or more ingress frames of bits, wherein each of the one or more ingress frames has one of multiple frame formats comprised in a set of frame formats; and convert each of the one or more ingress frames into a normalized frame of bits, wherein the normalized frame has a normalized frame format, wherein the normalized frame comprises an instruction frame in a control plane and a data frame in a data plane, wherein the data frame comprises a corresponding ingress frame, and wherein the instruction frame comprises an instruction to process the data frame in each of one or more processing stages.

18. The computer program product of claim 17, wherein the multiple frame formats are based on the following protocols:

Controller Area Network (CAN);
CAN Flexible Data Rate;
CAN XL;
Local Interconnect Network (LIN);
FlexRay;
Media Oriented System Transport (MOST);
Ethernet;
Mobile Industry Processor Interface (MIPI); or
Camera Serial Interface 2.

19. The computer program product of claim 17, wherein the normalized frame comprises a plurality of fields, and wherein each of the fields is parameterized by a field index or by an offset parameter and a field size parameter.

20. The computer program product of claim 17, wherein the normalized frame comprises a header, a payload, and a trailer, and wherein the payload comprises the corresponding ingress frame.

* * * * *